United States Patent
Ueda et al.

(10) Patent No.: US 11,002,570 B2
(45) Date of Patent: May 11, 2021

(54) FIXED ELEMENT AND POSITION DETECTION DEVICE

(71) Applicant: Yamaha Corporation, Shizuoka (JP)

(72) Inventors: Taku Ueda, Shizuoka (JP); Yoshihiro Suzuki, Shizuoka (JP); Yoshikatsu Matsubara, Shizuoka (JP); Yoshihiro Natsume, Shizuoka (JP); Hisakazu Kato, Shizuoka (JP)

(73) Assignee: YAMAHA CORPORATION, Shizuoka (JP)

( * ) Notice: Subject to any disclaimer, the term of this patent is extended or adjusted under 35 U.S.C. 154(b) by 271 days.

(21) Appl. No.: 16/134,761

(22) Filed: Sep. 18, 2018

(65) Prior Publication Data

US 2019/0025090 A1     Jan. 24, 2019

Related U.S. Application Data

(63) Continuation of application No. PCT/JP2017/012044, filed on Mar. 24, 2017.

(30) Foreign Application Priority Data

Mar. 25, 2016    (JP) ............................. JP2016-062687

(51) Int. Cl.
    *G01D 5/243*       (2006.01)
    *G01D 5/241*       (2006.01)

(52) U.S. Cl.
    CPC ........... *G01D 5/243* (2013.01); *G01D 5/2415* (2013.01)

(58) Field of Classification Search
    CPC .................................................... G01D 5/243
    See application file for complete search history.

(56) References Cited

U.S. PATENT DOCUMENTS

| 4,743,838 | A | * | 5/1988 | Eckerle | ................ | G01D 5/2415 |
| | | | | | | 324/660 |
| 4,879,508 | A | * | 11/1989 | Andermo | ............... | G01B 7/003 |
| | | | | | | 324/690 |
| 4,882,536 | A | * | 11/1989 | Meyer | .................. | G01D 5/2415 |
| | | | | | | 324/671 |

(Continued)

FOREIGN PATENT DOCUMENTS

| JP | S59-212711 A | 12/1984 |
| JP | H01-185913 A | 7/1989 |

(Continued)

OTHER PUBLICATIONS

Translation of Office Action in the corresponding Chinese Patent Application No. 201780019713.4, dated Mar. 20, 2020.

(Continued)

*Primary Examiner* — Jeff W Natalini
(74) *Attorney, Agent, or Firm* — Global IP Counselors, LLP

(57) ABSTRACT

A fixed element is provided to be used in a position detection device for detecting a position of a movable element that moves on the fixed element. The fixed element includes a substrate, a plurality of first electrodes and a second electrode. The substrate has as first surface, a second surface and a low-dielectric constant area. The second surface faces in an opposite direction to the first surface. The low-dielectric constant area has a lower-dielectric constant than other portions of the substrate. The first electrodes are disposed on the first surface of the substrate. The first electrodes include three or more phases arranged one-dimensionally in a repeating pattern in a movement direction of the movable element. The second electrode is disposed on the first surface of the substrate and is arranged in the movement direction of the movable element adjacent the first electrodes. The low-dielectric constant area of the substrate is provided in a position between the first electrodes and the second electrode.

6 Claims, 8 Drawing Sheets

(56) References Cited

U.S. PATENT DOCUMENTS

| | | | | |
|---|---|---|---|---|
| 6,072,318 A | * | 6/2000 | Jordil | G01D 5/2415 |
| | | | | 324/660 |
| 2005/0195097 A1 | | 9/2005 | Gondoh | |
| 2005/0270040 A1 | * | 12/2005 | Stridsberg | G01D 5/2415 |
| | | | | 324/662 |
| 2012/0025851 A1 | * | 2/2012 | Homeijer | G01D 5/2415 |
| | | | | 324/686 |
| 2015/0268790 A1 | * | 9/2015 | Meyer | G06F 3/0362 |
| | | | | 345/174 |
| 2016/0161292 A1 | * | 6/2016 | Rohner | G01D 5/2415 |
| | | | | 324/662 |

FOREIGN PATENT DOCUMENTS

| | | |
|---|---|---|
| JP | 2005-221472 A | 8/2005 |
| JP | 2011-047679 A | 3/2011 |
| JP | 2011-185882 A | 9/2011 |
| JP | 2014-183697 A | 9/2014 |

OTHER PUBLICATIONS

International Search Report in PCT/JP2017/012044 dated Jun. 27, 2017.
Translation of Office Action in the corresponding Japanese Patent Application No. 2016-062687, dated Feb. 12, 2020.
Translation of Office Action in the corresponding Japanese Patent Application No. 2016-062687, dated Sep. 23, 2020.
Translation of Office Action in the corresponding Chinese Patent Application No. 201780019713.4, dated Dec. 7, 2020.

* cited by examiner

FIXED ELEMENT AND POSITION DETECTION DEVICE

CROSS-REFERENCE TO RELATED APPLICATIONS

This application is a continuation application of International Application No. PCT/JP2017/012044, filed Mar. 24, 2017, which claims priority to Japanese Patent Application No. 2016-062687 filed in Japan on Mar. 25, 2016. The entire disclosures of International Application No. PCT/JP2017/012044 and Japanese Patent Application No. 2016-062687 are hereby incorporated herein by reference.

BACKGROUND

Technological Field

The present invention relates to a position detection device that detects the relative positions a movable element that moves on a fixed element, as well as to a substrate (printed-circuit board) that constitutes the fixed element described above.

Background Technology

Various position detection devices have been proposed for detecting the relative positions of a movable element that moves on a fixed element. For example, Japanese Laid-Open Patent Application No. 2005-221472 (Patent Document 1) discloses supplying a voltage to an induction electrode of a fixed element to generate an alternating potential distribution in a comb-shaped electrode of a movable element by means of capacitive coupling, detecting the alternating potential distribution using a voltage detection electrode of the fixed element to generate a vector having two signals as its components, and measuring the relative potential of the movable element referenced to the fixed element from the rotation angle of the vector. In addition, Japanese Laid-Open Patent Publication No. 2011-47679 (Patent Document 2) discloses supplying four electrical signals shifted in phase by 90 degrees to four-phase electrodes on a fixed element and measuring the position of the movable element relative to the fixed element on the basis of the phases of the signals that are thereby induced in a first electrode and a second electrode on the movable element.

SUMMARY

However, in the conventional position detection device described above, if it is attempted to make the range of possible movement of the movable element large, there is the problem that sufficient detection precision cannot be ensured. This is because signal leakage occurs between electrodes tar supplying signals of a plurality of phases and electrodes for extracting signals on the fixed element. Even if the range of possible movement of the movable element is increased, because the detection precision deteriorates if the interval between electrodes for signal supply is increased, it becomes necessary to narrow the interval and to increase the number of electrodes. If the number of electrodes increases, signal leakage will increase accordingly, which, as non-negligible noise, affects the position detection result.

An object of the present invention is to solve such a problem and to make it possible to precisely detect the relative positions of a fixed element and a movable element that moves on the fixed element, even if the range of possible movement of the movable element is increased.

In order to realize, the object described above, a fixed element is provided to be used in a position detection device for detecting a position of a movable element that moves on the fixed element. The fixed element includes a substrate, a plurality of first electrodes and a second electrode. The substrate has a first surface, a second surface and a low-dielectric constant area. The second surface faces in an opposite direction to the first surface. The low-dielectric constant area has a lower dielectric constant than other portions of the substrate. The first electrodes are disposed on the first surface of the substrate. The first electrodes include three or more phases arranged one-dimensionally in a repeating pattern in a movement direction of the movable element. The second electrode is disposed on the first surface of the substrate and is arranged in the movement direction of the movable element adjacent the first electrodes. The low-dielectric constant area of the substrate is provided in a position between the first electrodes and the second electrode.

In such a substrate, the low-dielectric constant area is preferably a slit. Furthermore, it is preferable to provide an electrical signal propagation shield is provided in a position that overlaps with the first electrodes arranged inside the substrate described above as viewed in a direction perpendicular to the first surface of the substrate. Furthermore, it is preferable to provide a shield is provided in a position that does not overlap the area where the first electrodes arranged inside the substrate or on a second surface on the rear side of the first surface as viewed in a direction perpendicular to the first surface of the substrate, avoiding the position that overlaps an area where the second electrode is arranged in a plan view.

In addition, a position detection device comprises a fixed element, a supply circuit, a movable element and a detection circuit. The fixed element is constituted by any one of the substrate described above. The supply circuit supplies at least three phase signals corresponding in number to the phases of the first electrodes. The movable element has a third electrode that is capacitively coupled to at least a pec ion of the second electrode and at least one of the first electrodes while the movable element moves relative to the fixed element. The detection circuit detects a signal that is generated in the second electrode in accordance with the supply of signals from the supply circuit due to the third electrode being capacitively coupled.

In addition, another substrate is provided in which the second electrode includes two second electrodes that extend in the movement direction of the movable element on the first surface of the substrate with the first electrodes disposed, between the second electrodes, and the low-dielectric constant area includes a first low-dielectric constant area and a second low-dielectric constant area. The first low-dielectric constant area is provided between one of the second electrodes and the first electrodes, and the second low-dielectric constant area is provided between the other of the second electrodes and the first electrodes.

In addition, another position detection device comprises a fixed element, a supply circuit, a movable element and a detection circuit. The fixed element is constituted by the substrate described above The supply circuit supplies at least three phase signals corresponding in number to the phases of the first electrodes. The movable element has a pair of third electrodes. One of the third electrodes is capacitively coupled to at least a portion of one of the two second electrodes and at least one of the first electrodes while the movable element moves relative to the fixed element. The other of the third electrodes is capacitively coupled to at least a portion of the other of the second electrode and at least one of the first electrodes having an opposite phase of the at least one of the first electrodes while the movable element moves relative to the fixed element. The detection circuit detects a signal that is generated in the second electrode in accordance with the supply of signals from the supply circuit due to the third electrode being capacitively coupled.

In addition, a fixed element is provided to be used in a position detection device for detecting a position of a movable element that moves on the fixed element. The fixed element includes a substrate, a plurality of first electrodes, a second electrode and wiring. The substrate has a first surface, a second surface and a low-dielectric constant area. The second surface faces in an opposite direction to the first surface. The wirings electrically connect each of the first electrodes in a position that overlaps with the first electrodes inside the substrate or on a rear side of the first surface as viewed in a direction perpendicular to the first surface of the substrate. The wirings are arranged such that different phases of the wiring are in a position closest to the second electrode from among the wirings, as a function of the position in an arrangement direction of the first electrodes.

In such a substrate, the wiring of each phase above is preferably disposed to be closest to the second electrode from among the wirings at intervals that are substantially equal in length when seen in the arrangement direction of the first electrodes. Furthermore, it is preferable to connect the plurality of first electrodes of each phase with wiring of that phase via a through-hole formed on the substrate. Furthermore, it is preferable to provide an electrical signal shield for shielding the propagation of electrical signals in a position that overlaps the area where the first electrodes are arranged in a plan view between the first surface of the substrate and the wirings.

Furthermore, it is preferable to provide a shielding member for shielding the propagation of electrical signals in a position that does not overlap the area where the first electrodes are arranged in a plan view inside the substrate or on a second surface on the rear side of the first surface, avoiding the position that overlaps an area where the second electrode is arranged in a plan view. Furthermore, at least one of the wirings is divided into two partial wirings in a position that overlaps at least one of the first electrodes that is connected in a plan view, and the two partial wirings are preferably electrically connected via the first electrode.

In addition, another position detection device comprises a fixed element constituted by any one of the substrates described above; a supply circuit that supplies at least three phase signals corresponding in number to the phases of the first electrodes via the wirings; a movable element having a third electrode, wherein, when the movable element is disposed on the fixed element, the third electrode is capacitively coupled to at least a portion of the second electrode and at least one of the first electrodes; and a detection circuit that detects a signal that is generated in the second electrode in accordance with the supply of signals by the supply circuit.

Additionally, another substrate is provided with, in any one of the substrates described above, two electrodes respectively on both sides in the vicinity of the first electrodes in the movement direction of the movable element as the second electrode, and, with respect to each of the two second electrodes, the wirings are arranged such that wirings of different phase are in a position closest to the second electrode from among the wirings as a function of the position in the arrangement direction of the first electrodes.

Additionally, another position detection device comprises a fixed element constituted by the substrate described above; as supply circuit that supplies at least three phase signals corresponding in number to the phases of the first electrodes via the wirings a movable element having two third electrodes, wherein, when the movable element is disposed on the fixed element, one of the third electrodes is capacitively coupled to at least a portion of one of the second electrodes and at least one first electrode, and the other third electrode is capacitively coupled to at least a portion of the other second electrode and at least one first electrode having the opposite phase of the at least one first electrode; and a detection circuit that detects the difference between two signals that are generated in the two second electrodes in accordance with the supply of signals by the supply circuit due to the capacitive coupling.

In addition to its implementation as a device, as described above, the present invention can be implemented in a variety of forms, such as a system, a method, a program, or a storage medium.

According to a configuration of the present invention such as described above, it is possible to precisely detect the relative positions of a fixed element and as movable element that moves on the fixed element, even if the range of possible movement of the movable element is increased.

DETAILED DESCRIPTION OF THE EMBODIMENTS

Selected embodiments will now be explained with reference to the drawings. It will be apparent to those skilled in the position detection field and the substrate field from this disclosure that the following descriptions of the embodiments are provided for illustration only and not for the purpose of limiting the invention as defined by the appended claims and their equivalents.

Figure 3:
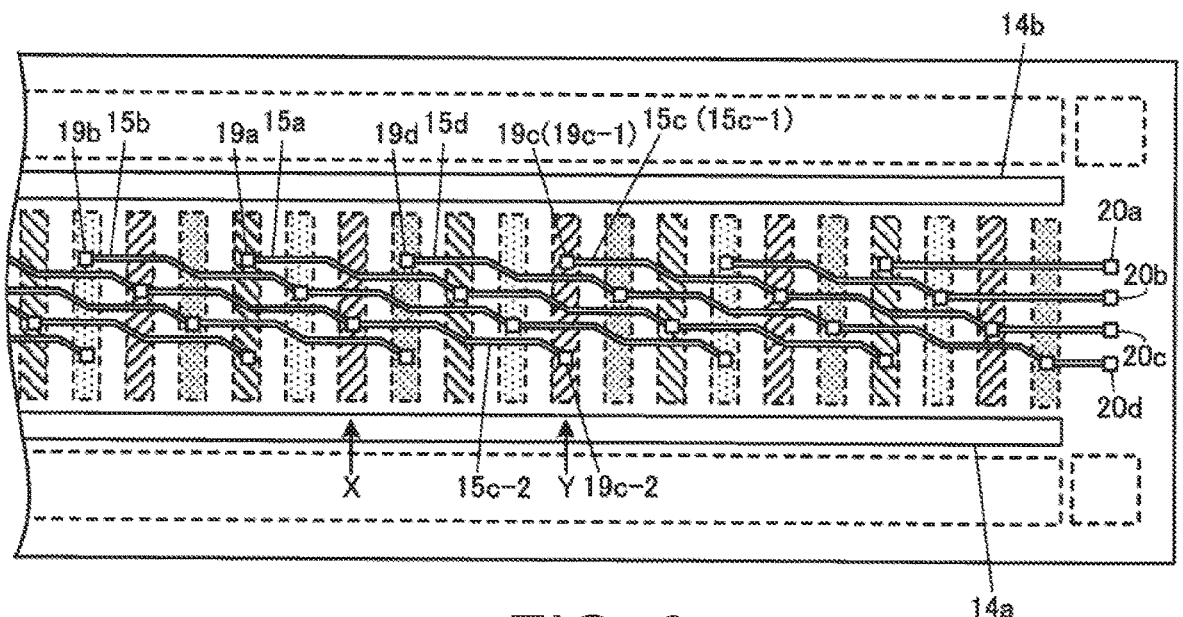
FIG. 3 is a bottom plan view of the substrate shown in FIG. 1.
Figure 4:
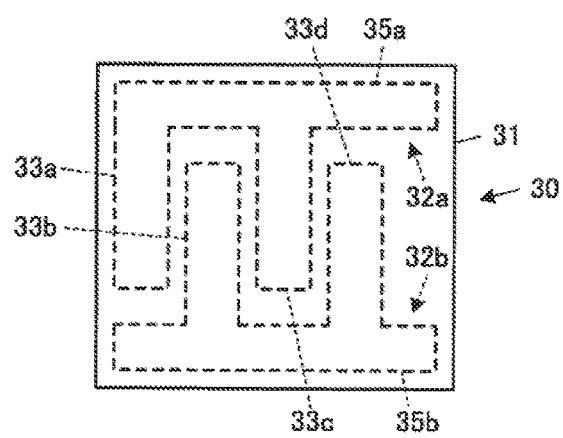
FIG. 4 is a top plan view of a movable element that is disposed on the substrate shown in FIG. 1.
Figure 5:
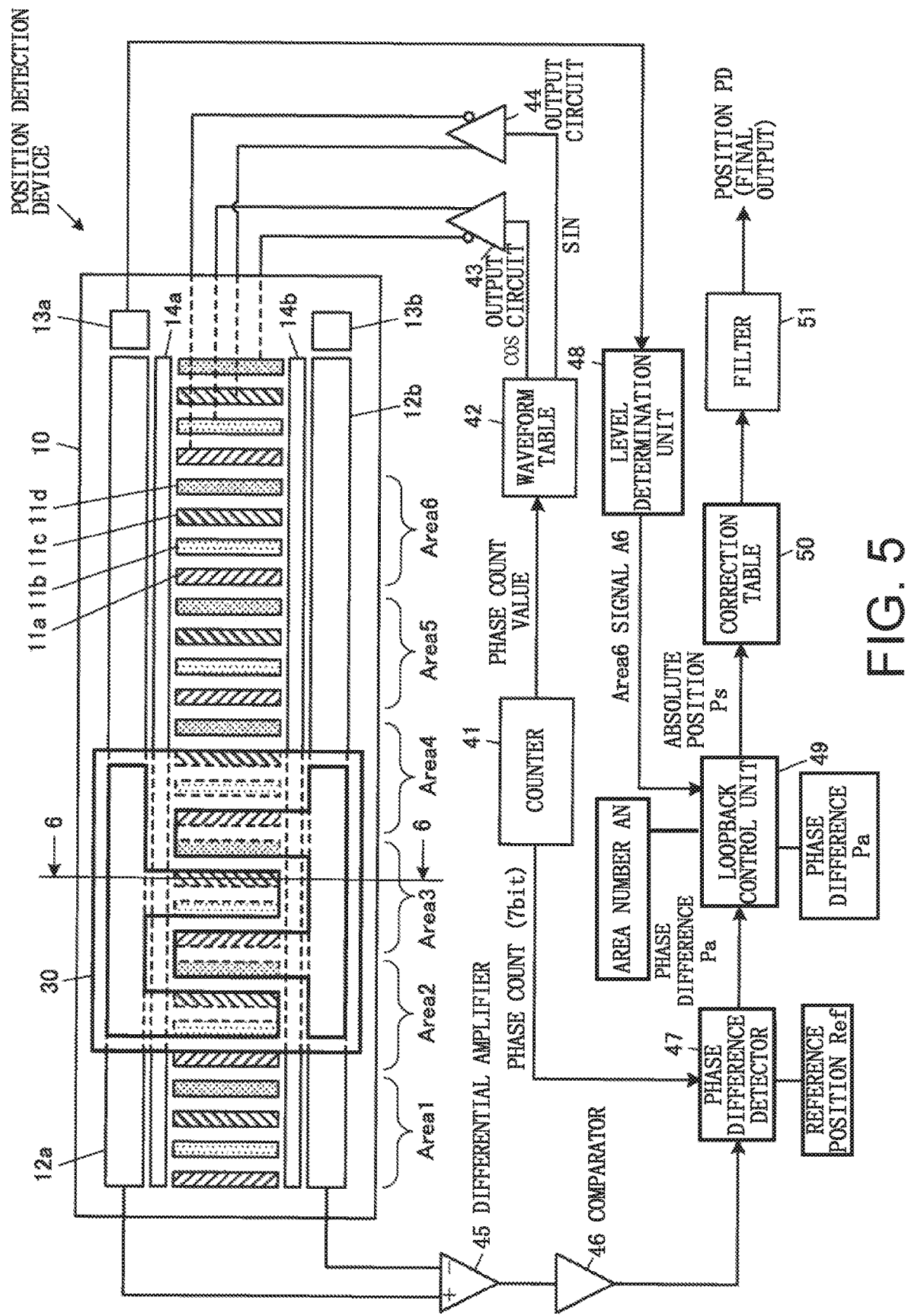
FIG. 5 is a schematic view showing a schematic overview of the position detection device according to one embodiment.

Referring to FIGS. 1 to 7, a first embodiment of a position detection device and a substrate will now be described. FIG. 5 shows a schematic overview including a detection circuit of the position detection device according to the first embodiment.

The position detection device 1 shown in FIG. 5 is an embodiment of the position detection device according to the present invention, comprising a substrate 10 (printed-circuit board), which is a fixed element, and a movable element 30 (small printed-circuit board) that moves on the substrate 10, and the device detects and outputs the position of the movable element 30 on the substrate 10. The position of the movable element 30 that is detected by the position detection device 1 is the position of the movable element 30 relative to the substrate 10, which is referred to as the absolute position. In addition, the movement path of the movable element 30 is restricted to an appropriate one-dimensional range on the substrate 10 by an appropriate known method.

Figure 1:
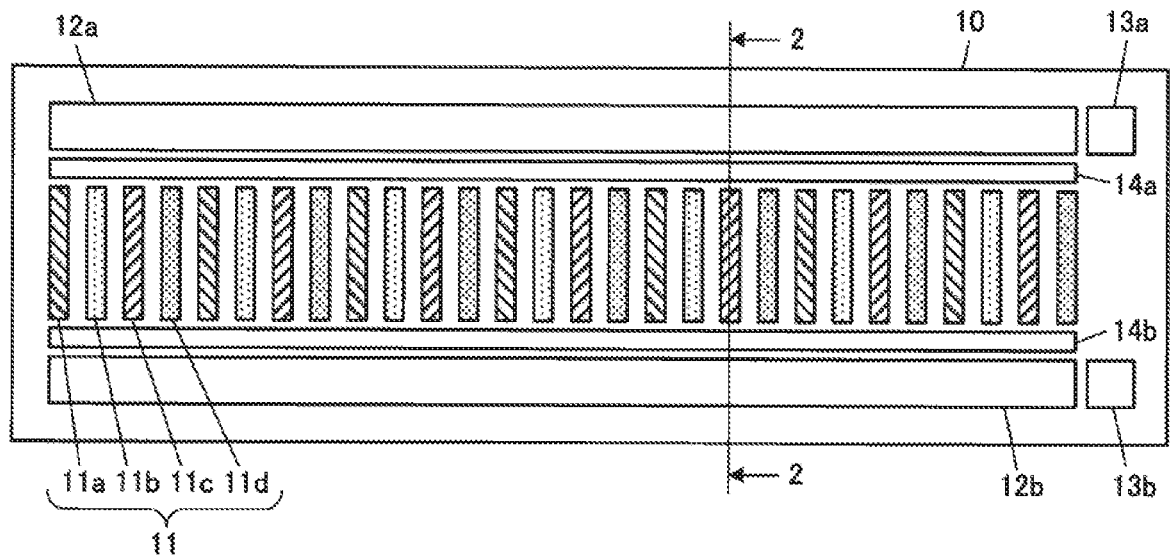
FIG. 1 is a top plan view of a substrate provided in a position detection device according to one embodiment.
Figure 2:
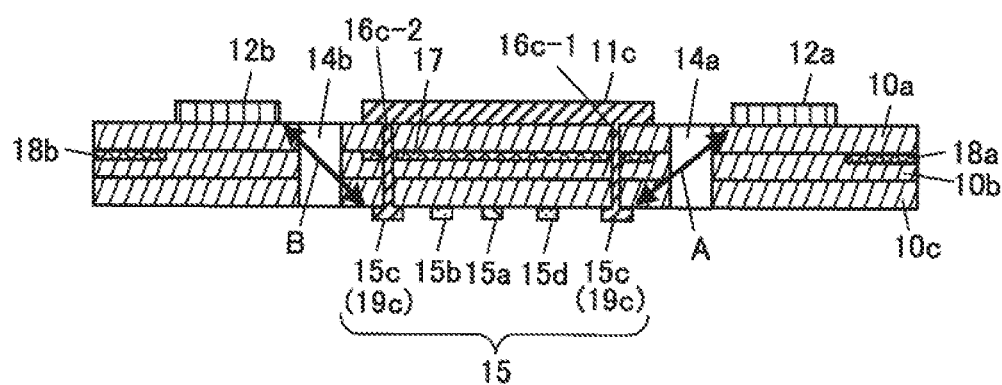
FIG. 2 is a cross-sectional view of the substrate taken along section line 2-2 of FIG. 1.

Here, the substrate 10 will be described first, with reference to FIGS. 1 to 3. FIG. 1 is a plan view of the substrate 10. FIG. 2 is a cross-sectional view taken along line 2-2 of FIG. 1. FIG. 3 is a bottom surface view showing the arrangement of the wiring electrodes on the rear surface of the substrate 1. Substrate 10 shown in FIG. 1 is a hard substrate that does not readily deform, formed from an insulating material, such as resin. In addition, although the substrate has a three-layer structure, comprising a first layer 10a to a third layer 10c, as shown in FIG. 2, the material of each layer may be the same or different. In addition, various electrodes and wirings are printed on each layer, which are superposed and bonded. Substrate 10 need not be formed from a plurality of layers, and can be formed from only one layer.

Provided on a first surface of the substrate 10 on the front side in FIG. 1 are a signal electrode 11, a pair of extraction electrodes 12a, 12b, and a pair of reference position electrodes 13a, 13b. In addition, an air gap 14a is provided between the signal electrode 11 and the extraction electrode 12a, and an air gap 14b is provided between the signal electrode 11 and the extraction electrode 12b. These elements 11-14 (and the wiring 15 and the via 19, etc., which are described below) are substrate-side elements for detecting the position of one movable element 30. If the substrate 10 is sufficiently wide, it is possible to provide on a single substrate 10 a plurality of substrate-side elements 11-19 that correspond to a plurality of movable elements 30 in order to measure the position of each movable element 30.

The signal electrode 11 is a first electrode in which a plurality of electrodes, to which are supplied four-phase electrical signals that are successively shifted in phase by 90 degrees, are repeatedly arranged in one-dimensional fashion in the movement direction of the movable element 30. For example, a first phase electrode 11a to which the first phase (+0°) signal is supplied, a second phase electrode 11b to which the second phase (+90°) signal is supplied, a third phase electrode 11c to which the third phase (+180°) signal is supplied, and a fourth phase electrode 11d to which the fourth phase (+270°) signal is supplied, are repeatedly arranged in that order. The hatching (dots, diagonal lines) for the electrodes in the drawing indicates the phase of each electrode. Electrodes with the same hatching are electrodes with the same phase.

The extraction electrodes 12a, 12b are second electrodes that are respectively provided adjacent the two sides of the signal electrode 11 and that are used to extract electrical signals that are induced in the electrodes on the movable element 30 side by means of capacitive coupling, in accordance with the electrical signal that is supplied to the signal electrode 11. The mechanism of this extraction will be described in detail further below. The reference position electrodes 13a, 13b are electrodes provided adjacent the end portions of the extraction electrodes 12a, 12b, and that are used to extract electrical signals that are induced in the electrodes on the movable element 30 side, when the movable element 30 is in Area 6 shown in FIG. 5. The mechanism of this extraction will also be described in detail further below.

As shown in FIG. 2, the air gaps 14a, 14b are provided as elongated through-holes, i.e., slits that pass through the first layer 10a through the third layer 10c of the substrate 10. The widths thereof are substantially uniform over their entire length. These air gaps 14a, 14b are provided for reducing the propagation of signals via a direct capacitive coupling from the signal electrode 11 to the extraction electrode 12. That is, because there is direct capacitive coupling between the signal electrode 11 and the extraction electrode 12 which depends on the substrate material (in the sense that the propagation is not via the electrodes of the movable element 30, which is described below), if an AC signal is supplied to the signal electrode 11, the signal is propagated to the extraction electrode 12 by means of said direct capacitive coupling, regardless of the position of the electrodes on the movable element 30 side. This signal represents noise during detection of the position of the movable element 30. In addition, the intensity of the propagated signal is inversely proportional to the capacitive reactance (resistance component) that is directly formed between the signal electrode 11 and the extraction electrode 12.

Therefore, by interposing a low-dielectric constant portion with a relatively lower dielectric constant than the substrate between the signal electrode 11 and the extraction electrode 12 (reference numeral "12" is used when individual electrodes are not distinguished), thereby increasing the capacitive reactance (decreasing the electrostatic capacitance), and signal propagation can be suppressed. In the example of FIG. 1, air gaps 14a, 14b are provided for the purpose or interposing air, which has a lower relative dielectric constant than resin (having a relative dielectric constant of 2-4, for example), which is the material of the substrate 10. However, the same effect can be achieved by using a filler material that has a lower relative dielectric constant than the material of the substrate 10.

Thus, it is possible to suppress direct propagation of signals from the signal electrode 11 to the extraction electrode 12, and to detect the position of the movable element 30 accurately, even if the range of possible movement of movable element is set to be wide, and the number of signal electrodes 11 is thereby increased. Although the capacitive reactance can also be increased by increasing the distance between the signal electrode 11 and the extraction electrode 12, if the distance becomes too large, the size of the position detection device 1 increases. It is preferable to use moderate length and to provide air gaps 14a, 14b, as in this embodiment.

Moreover, if a reduction in the capacitive coupling described above is intended, the desired effect can be achieved to a certain extent by providing, as air gaps, for example, grooves that penetrate the first layer 10a and the second layer 10b, instead of a through hole. However, it is preferable to provide a through-hole for the following reasons. That is, it is known that if the substrate 10 is placed in an environment with a humidity of about 90% or more, fine water droplets that are not readily discerned by the naked eye form on the surface of the substrate 10. The resistance component between the signal electrode 11 and the extraction electrode 12 is decreased due to these water droplets, and signals propagate via this path. These signals also represent noise during detection of the position of the movable element 30.

However, it the air gaps 14a, 14b are made up of throughholes between the signal electrode 11 and the extraction electrode 12, the propagation of signals can be prevented even if water droplets form on the surface of the substrate 10, since the conduction path between the signal electrode 11 and the extraction electrode 12 is relatively long. Therefore, the position detection device 1 is able to detect the position of the movable element 30 accurately, even in a high-humidity environment.

Next, electrodes provided inside the substrate 10 and on a second surface on the rear side of the first surface (the front side surface in FIG. 3) will be described. As shown in FIG. 3, the wiring 15, the vias 19, and the terminal 20 are provided on the second surface of the substrate 10. For the wiring 15, the reference numeral "15" without an alphabetic character is used when it is not necessary to distinguish between the phases. Likewise, an alphabetic character is not used with "the via 19," "the terminal 20," and "the barrel 16" when it is not necessary to distinguish between the phases.

The wiring 15 15 electrically connects a plurality of the signal electrodes 11 of the same phase and supplies electrical signals to each of the signal electrodes 11. The vias 19 are connection portions for electrically connecting two electrodes on two different surfaces (the wiring 15 and the signal electrode 11, for example) via the barrel 16 provided in a through-hole that passes through the substrate 10, as shown in FIG. 2. The terminal 20 electrically connect the wiring 15 to an external circuit.

FIG. 3 shows a location (the location indicated by arrow X, for example) where one of the vias 19 is provided and a location (the location indicated by the arrow Y, for example) where two of the vias 19 are provided, which overlap one of the signal electrodes 11 in a plan view (when viewed from a direction perpendicular to the substrate 10). In the former location, the 15 is simply connected to the signal electrode 11 (refer to FIG. 6). However, in the latter location, the wiring 15 for one phase is divided into two partial wiring on the left and right, the first partial wiring 15c-1 is connected to the signal electrode 11 through a first connection portion (the via 19c-1) and is further connected to the second partial wiring 15c-2 through a second connection portion (the via 19c-2). The second partial wiring 15c-2 is connected to each subsequent one of the signal electrodes 11.

The substrate 10 is provided with four-phase wirings 15a-15d, corresponding to the four-phase signal electrodes 11. Then, as shown in FIG. 3, the arrangement of the wiring 15 of each phase in the vertical direction in FIG. 3 is alternatingly replaced, such that the wiring 15 of different phase arrive at positions that are closest to the extraction electrode 12 among the four-phases of the wirings 15, in accordance with the position in the arrangement direction of the signal electrode 11. Due to this replacement, a location where two of the vias 19 are provided in a position that overlaps one signal electrode 11 in a plan view is provided when one wiring crosses another wiring.

In addition, the wiring 15 of each phase is configured to be in a position closest to the extraction electrode 12 among the four-phases of the wirings 15 at intervals that are substantially equal in length when seen in the arrangement direction of the signal electrodes 11. A "position closest to the extraction electrode 12" includes a "position closest to the extraction electrode 12a" and a "position closest to the extraction electrode 12b," but in either case, it is preferable if the "intervals that are substantially equal in length" above holds true.

Here, direct capacitive coupling such as that indicated by arrow A is formed between the extraction electrode 12a and the wiring 15 that is in a position closest to the extraction electrode 12a. In the same manner, direct capacitive coupling such as that indicated by arrow B is formed between the extraction electrode 12b and the wiring 15 that is in a position closest to the extraction electrode 12b. Then, AC signals that are supplied to the wiring 15 via these capacitive couplings are propagated to the extraction electrodes 12a, 12b, which represent noise during detection of the position of the movable element 30.

In particular, if only the wiring 15 of a specific phase is in a location closest to the extraction electrode 12, electrical signals of a specific phase will be supplied to the extraction electrode 12. Consequently, there is a significant effect on the position detection of the movable element 30 that is based on the phase of electrical signals, as described below. However, if wirings 15 of different phase are in positions closest to the extraction electrode 12 depending on the position in the arrangement direction of the signal electrode, signals of a plurality of phases will be propagated along the extraction electrode 12; therefore, signals of opposite phase will cancel each other out along the extraction electrode 12, and it becomes possible to reduce the overall influence of the propagated signals from the wiring 15. If the wiring 15 of each phase is configured to be in a position closest to the extraction electrode 12 at intervals that are substantially equal in length when seen in the arrangement direction of the signal electrodes 11, this effect becomes more pronounced.

In addition to the foregoing, a plurality of shielding electrodes 17, 18a, 18b are provided on the second layer 10b within the substrate 10. The shielding electrodes 17, 18a, 18b are connected to ground and function as elements that provide shielding against the propagation of electrical signals. The shielding electrode 17 is provided in a location which, in plan view, overlaps the area in which the signal electrode 11 is disposed, and is provided in order to prevent the propagation of electrical signals between the signal electrode 11, on the one hand, and the wiring 15 and the via 19, on the other, that do not pass through the barrel 16. A shielding electrode 17 is not provided in the position of the barrel 16, and a hole (antipad) that is slightly larger than the barrel 16 is provided on the shielding electrode 17, such that the shielding electrode 17 and the barrel 16 do not come into contact.

In addition, the shielding electrodes 18a, 18b are provided in order to prevent the propagation of noise signals from the outside to the respective extraction electrodes 12a, 12b. However, the shielding electrodes 18a, 18b are provided so as to avoid positions that overlap the extraction electrodes 12a, 12b in a plan view. This is because, if they are provided in positions that overlap in a plan view, the capacitive coupling is by arrow A and arrow B increases, and leakage from the wiring 15 to the extraction electrodes 12a, 12b increases.

Figure 6:
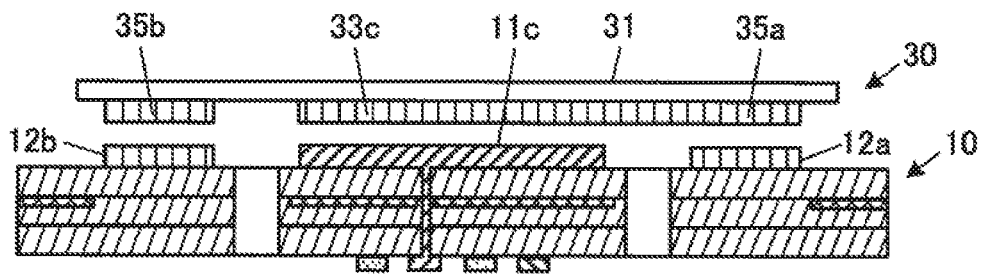
FIG. 6 is a cross-sectional view of the position detection device taken along section line 6-6 of FIG. 5.

Next, the movable element 30 will be described with reference to FIGS. 4 to 6. FIG. 4 is a plan view of a movable element 30. The movable element 30 is formed by arranging (printing) a pair of movable element electrodes 32a, 32b, which are third electrodes, on the rear side surface of the substrate 31 in FIG. 4. The movable element electrode 32a comprises a first opposing portion 33a and a third opposing portion 33c, which respectively oppose the signal electrode 11, and a signal extracting portion 35a that opposes the extraction electrode 12a. In addition, the movable element electrode 32b comprises a second opposing portion 33B and a fourth opposing portion 33d, which respectively oppose the signal electrode 11, and a signal extracting portion 35b that is opposed with the extraction electrode 12b.

FIG. 5 shows a state in which the movable element 30 is disposed on the substrate 10. FIG. 6 is a cross-sectional view taken along line 6-6 of FIG. 5. In FIG. 5, the movable element electrodes 32a, 32b are on the rear side of the substrate 31, but are indicated by solid lines for clarity of illustration. As shown in FIG. 5, the first opposing portion 33a and the third opposing portion 33C of the movable element electrode 32a oppose an electrode of one phase of the signal electrode 11 depending on the position of the movable element 30 and are dimensioned such that they oppose electrodes of the same phase that are separated by exactly one cycle.

Additionally, if an electrical signal is supplied to the signal electrode 11, electrical signals are thus also induced in the first opposing portion 33a and the third opposing portion 33c due to capacitive coupling. Because they oppose electrodes of the same phase, electrical signals of the same phase are induced in the first opposing portion 33a and the third opposing portion 33c. These electrical signals are propagated to the signal extracting portion 35a. Due to the occurrence of electrical signals in the signal extracting portion 35a, electrical signals are also induced, due to capacitive coupling, in the extraction electrode 12a, which opposes the signal extracting portion 35a.

The electrical signals induced in the extraction electrode 12a have a different phase depending on which phase signal electrode 11 the first opposing portion 33a and the third opposing portion 33c are opposite to, that is, depending on the position of the movable element 30. For example, if the first opposing portion 33a and the third opposing portion 33c are in positions that oppose only the first phase electrode 11a an electrical signal of the same phase as the first phase is induced in the extraction electrode 12a. In addition, if the position just covers both the second phase electrode 11b and the third phase electrode 11c, as illustrated in FIG. 5, a phase that is intermediate between the second phase and the third phase (phase of a signal obtained by adding the signals of the second phase and third phase) is induced in the extraction electrode 12a.

Similarly, even when in other positions, a signal whose phase varies continuously in accordance with the position of the movable element 30 is induced in the extraction electrode 12a. In addition, the phase changes 360° (corresponding to one cycle) each time the movable element 30 moves a distance corresponding to signal electrodes 11 for four phases, that is, one area indicated by "Area" in FIG. 5. Thus, it is possible to detect the position of the movable element 30 within each region based on the phase of the electrical signal that is generated in the extraction electrode 12a.

The same relationship also exists between the second opposing portion 33b and fourth opposing portion 33d of the movable element electrode 32b, the signal electrode 11, and the extraction electrode 12b. However, the signal electrode 11 that opposes the second opposing portion 33b and the fourth opposing portion 33d is an electrode of a different phase that is shifted by two phases from the signal electrode that opposes the first opposing portion 33a and the third opposing portion 33c. For example, when the phases of the electrical signals of the respective phases differ by 90°, they will oppose the signal electrode 11 of opposite phase, compared to the case of the first opposing portion 33a and the third opposing portion 33c. Thus, the electrical signal induced in the extraction electrode 12b is an electrical signal of opposite phase of the signal induced in the extraction electrode 12a, and by taking the difference between these the signal is amplified, whereas noise signals that are common to the two extraction electrodes 12a, 12b cancel out, thereby improving the detection accuracy of the position of the movable element 30.

In addition, for the sake of convenience, the "Areas" mentioned above shall be divided with reference to the position of the first opposing portion 33a and the position where the center of the first opposing portion 33a overlaps the center of the first phase electrode 11a shall be the break between the areas. In the position detection device 1, six areas are provided, "Area1" to "Area6."

Here, if the movable element 30 is in "Area6," the signal extracting portions 35a, 35b oppose not only extraction electrodes 12a, 12b, but also the reference position electrodes 13a, 13b. Therefore, electrical signals to an extent that can be detected are induced in the reference position electrodes 13a, 13b due to capacitive coupling via the signal extracting portions 35a, 35b, only when the movable element is in "Area6". On the other hand, when the movable element is not in "Area6," only weak electrical signals are induced. Thus, when electrical signal of at least a prescribed intensity are output from the reference position electrodes 13a, 13b, the movable element 30 is in "Area6." By combining this with the phase of the electrical signals from the extraction electrodes 12a, 12b, it is possible to specify the position of the movable element 30 within "Area6."

The position of "Area6," that is, the position at which the reference position electrodes 13a, 13b are provided, is not limited to this example, and can be provided anywhere. In this case, it is possible to provide the reference position electrodes 13a, 13b, for example, on the outer side of the extraction electrodes 12a, 12b, and the signal extracting portions 35a, 35b may be provided extended to the outer side of the extraction electrodes 12a, 12b. However, it is possible to save space by providing the reference position electrodes 13a, 13b on the extended line of the extraction electrodes 12a, 12b, as in this example.

In addition, although it is sufficient if only one of the reference position electrodes 13a, 13b is provided, the reason that two are provided is to make the signal leakage from the two signal extracting portions 35a, 35b to the reference position electrode equal, and to make the influence of two of the extraction electrodes 12a, 12b on the two electrical signals the same. In order to secure sufficient coupling capacity, the range of possible movement of the movable element preferably is set such that the right ends of the extraction electrodes 12a, 12b cover the reference position electrodes 13a, 13b, and cannot extend farther to the right.

Next, in the position detection device 1 described above, the configurations and the operations of a supply circuit formed by blocks 41-44 that generate electrical signals and supply the same to each signal electrode 11 and of a detection circuit formed by blocks 41, 45-51 that detect the position of the movable element 30 on the basis of electrical signals from the extraction electrodes 12a, 12b and the reference position electrodes 13a, 13b in accordance with said signals, will be described with reference to FIG. 5.

The constituent blocks 41-51 of the position detection device 1 shown in FIG. 5 can all be mounted on the substrate 10, or a portion may be mounted on the substrate 10 and the rest mounted on a separate substrate. In addition, each of the rectangular blocks in FIG. 5 may be respectively configured from a dedicated circuit, or the functions thereof can be realized by executing a required program with a processor. The position detection device 1 comprises, for example, a counter 41, a waveform table 42, a pair of output circuits 43, 44, a differential amplifier 45, a comparator 46, a phase difference detector 47, a level determination unit 48, a loopback control unit 49, a correction table 50, and a filter 51.

Of the above, the counter 41 counts a prescribed free-running clock signal (for example, several MHz to several tens of MHz) and outputs a count value, which is, the phase of the electrical signal that is supplied to the signal electrode 11. For example, in the case of a 7-bit counter, the count from 0 to 127 is repeated, and the frequency thereof becomes several tens of kHz to several hundreds of kHz. The count values of the counter 41 are such that, for example, 0 corresponds to 0°, 32 corresponds to 90° 64 corresponds to 180° and 96 corresponds to 270°, which are supplied to the waveform table 42 and the phase difference detector 47.

The waveform table 42 stores sample values of sine waves corresponding to at least ¼ cycle, and, taking the count value from the counter 41 as the phase, generates a sample value of a sine wave (sin) and a cosine-wave (cos) at the phase. The waveform table 42 outputs a cos sample value to the output circuit 43, and a sin sample value to the output circuit 44. The output circuits 43, 44 convert the respective input sample values into analog signals, amplify the analog signals with positive phase and the reverse phase of the positive phase and output same. The analog signals of each phase from the output circuits 43, 44 pass through the wiring 15 and the terminal 20 of the respective corresponding phase kind are supplied to the signal electrode 11.

A reverse phase cosine wave (−cos) of the fourth phase (+270°) is output from the inverting output of the output circuit 43 to the fourth electrode 11d, and a positive phase cosine wave (cos) of the second phase (+90°) is supplied from the non-inverting output to the second phase electrode 11b. In addition, a positive phase sine wave (sin) of the third phase (+180°) is output from the non-inverting output of the output circuit 44 to the third phase electrode 11c, and a reverse phase sine wave (−sin) of the first phase (+0°) is supplied from the inverting output to the first phase electrode 11a.

Next, the differential amplifier 45 outputs a difference signal that is the difference between the electrical signal from the extraction electrode 12a and the electrical signal from the extraction electrode 12b. The extraction electrode 12a side is positive, and the extraction electrode 12b side is negative. The comparator 46 outputs a pulse signal to the phase difference detector 47 at the time at which the output of the differential amplifier 45 changes from negative to positive.

The phase difference detector 47 latches the count value of the counter 41 at the time at which the pulse signal is input from the comparator 46 and supplies the difference between the latched count value and a reference count value Ref to the loopback control unit 49 as the phase difference Pa.

The phase difference detector 47 latches the count value of the counter 41 at the time at which the pulse signal is input from the comparator 46 and supplies the difference between the latched count value and a reference count value Ref to the loopback control unit 49 as the phase difference Pa. The differential amplifier 45, the comparator 46, and the phase difference detector 47 correspond to the detection circuit.

For example, when the movable element 30 is at the starting position of the first area, that is, at the position where the center of the first opposing portion 33a overlaps the center of the first phase electrode 11a, the phase count value that is latched by the pulse signal from the comparator 46 is taken as the reference count value. In such a case, since the first phase is −sin, this signal amigos from negative to positive at the time that the phase is 180° and the reference count value is 64. Thus, the reference count 64 should be subtracted from the latched count value. In addition, by associating a count value of 0 with 180°, it is possible to set the reference count value of the first phase to 0, and this subtraction be omitted. Furthermore, it is possible to use another phase (for example, third phase) as the reference instead of the first phase.

In contrast, for example, when the movable element 30 is at the position at which the center of the first opposing portion 33a overlaps the center of the second phase electrode 11b, the second phase is cos; therefore, this signal changes from negative to positive at the time that the phase is 270°. In this case, the latched count value is 96, and, by subtracting 64, the phase difference Pa becomes 32 (+90°). The phase difference Pa is, for example, 0 when the signal electrode 11 that opposes the first opposing portion 33a is the first phase, 32 when it is the second phase, 64 when it is the third phase, and 96 when it is the fourth phase.

The level determination unit 48 determines whether the intensity of the electrical signal from the reference position electrode 13a is at least a prescribed value, sets a signal A6, which indicates that the movable element 30 is in "Area6," to "1" if greater and to "0" if not, and outputs this signal to the loopback control unit 49. The loopback control unit 49 calculates the absolute position Ps of the movable element 30 on the basis of the phase difference Pa from the phase difference detector 47 and the signal A6 from the level determination unit 48 by using a process that is described below using FIG. 7.

The correction table 50 corrects the absolute position Ps that is calculated by the loopback control unit 49. Because the relationship between the position of the movable element 30 and the phase of the electrical signals from the extraction electrodes 12a, 12b is not completely linear, the correction table is used to restore linearity. The correction table 50 may be disposed in front of the loopback control unit 49 to correct the phase difference Pa from the phase difference detector 47 to be positionally linear.

The filter 51 removes abrupt changes from the corrected absolute position due to the correction table 50. This removal may be carried out by means of low-pass filtering that passes the low frequencies or by averaging the data for a prescribed period of time. Other appropriate methods may be employed. The output of the filter 51 is output from the position detection device 1 as the position PD of the movable element 30. If there is a plurality of substrates 10, then the configuration should be such that the supply circuits 41-44 shown in FIG. 5 input electrical signals of four phases to the plurality of substrates 10 in parallel, and the detection circuits 41, 45-51 receive the plurality of electrical signals from the extraction electrodes 12a, 12b of the plurality of substrates 10 in parallel and process them by means of time-division, in order to detect the position of the movable element 30 on each substrate 10.

Figure 7:
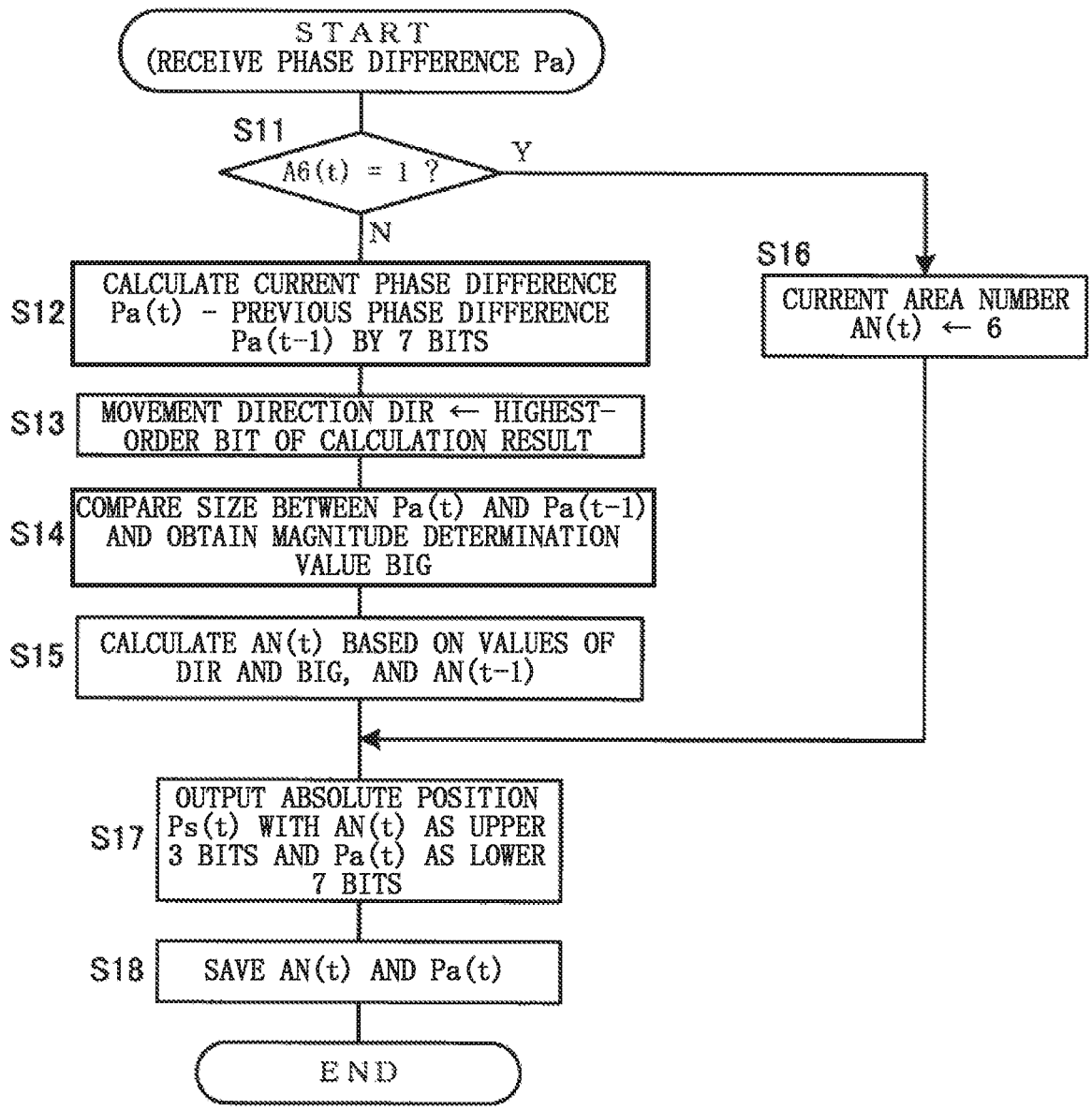
FIG. 7 is to flowchart of a process that is executed by a loopback control unit shown in FIG. 5.

The position detection process that is executed by the loopback control unit 49 will now be described with reference to FIG. 7. FIG. 7 is a flowchart of the process. When a phase difference Pa is input from the phase difference detector 47, the loopback control unit 49 acquires the signal A6 at that point in time and starts the process shown in the flowchart of FIG. 7. It should be noted that t is the activation count of the process of FIG. 7, Pa(t) is data acquired this time, and Pa(t−1) is the previously acquired data.

In the process of FIG. 7, the loopback control unit 49 first determines whether or not the value of the current signal A6(t) is "1" (S11). If this determination is No, the process proceeds to Step S12.

Here, the loopback control unit 49 first calculates the difference (7 bits) between the current phase difference Pa(t) and the pre nous phase difference Pa(t−1) as the movement amount MA (S12). Phase differences Pa are all 7 bits, and by discarding the overflow bits in this subtraction, the obtained movement amount MA will be in the range or −64 to +63.

Next, the loopback control unit 49 assigns the value of the highest-order bit of the movement amount MA of Step S12 to the movement direction DIR (S13).

In this embodiment, because the frequency of the four-phase signal is high at several tens of kHz to several hundreds of kHz, it is basically impossible for the phase difference Pa to fluctuate more than ½ cycle within 1 cycle.

If the movement amount MA is positive, the value of the movement direction DIR becomes "0," and if the movement amount MA is negative, the value of the movement direction becomes "1."

Next, the loopback control unit 49 compares the current phase difference Pa(t) with the previous phase difference Pa(t−1) and outputs a determination result BIG (S14). The value of BIG is "0" when the phase difference Pa(t) is large, and "1" when small.

The loopback control unit 49 calculates the current value of the area number AN(t) on the basis of the DIR and BIG obtained above, and the previous value of the area number AN(t−1) (S15).

More specifically, if the movement direction is positive (DIR=0) and the phase difference Pa(t) is large (BIG=0), or if the movement direction is negative and the phase difference Pa(t) is small (BIG=1), it cart be considered that the movable element 30 has not moved across areas. This is because the movement direction and the increase/decrease of the phase difference Pa match. In this case, the area number AN is not changed from the previous number.

In addition, if the movement direction is negative (DIR=1) and the phase difference Pa(t) is large (BIG=0), the phase difference Pa has moved in the negative direction and the phase difference Pa has increased, so that it can be seen that a carry down has occurred, that is, that the movable element 30 has moved to an area in which the area number is one smaller. In this case, the area number AN(t) decremented by one with respect to the previous value AN(t−1).

If the movement direction is positive (DIR=0) and the phase difference Pa(t) is small (BIG=1), the phase difference Pa has moved in the positive direction and the phase difference Pa has decreased, so that it can be seen that a carry up has occurred, that is, that the movable element 30 has moved to an area in which the area number is one greater. In this case, the area number AN(t) is incremented by one with respect to the previous value AN(t−1).

In the case of Yes in Step S11, because it can be understood that the movable element 30 is in "Area6," the value of the current area number AN(t) is set to "6" (S16).

In all cases of Steps S15 and S16, the loopback control unit 49 outputs an absolute position Ps(t) in which the currently calculated AN(t) occupies the upper 3 bits and the current phase difference Pa(t) occupies the lower 7 bits (S17), stores AN(t) and Pa(t) for reference during the subsequent process as the previous AN and Pa (S18), and ends the process.

With the foregoing processing, the loopback control unit 49 is able to generate and output the absolute position Ps(t). In this embodiment, the entire scale, that is, the range of possible movement of the movable element 30, is divided into a plurality of areas; the absolute position Pa within the area is obtained by using four-phase signal electrodes 11 for each area; the cumulative value AN of movements across areas is detected on the basis of the time change; and the absolute position in the entire scale can be obtained from the absolute position Pa within the area and the cumulative value AN.

In the above-described embodiment, the level determination unit 48 detects that the movable element 30 is in a specific position (position corresponding to the phase difference Pa(t)) in "Area6", on the basis of the intensity of the electrical signal that is generated in the reference position electrode 13a due to capacitive coupling.

Figure 8:
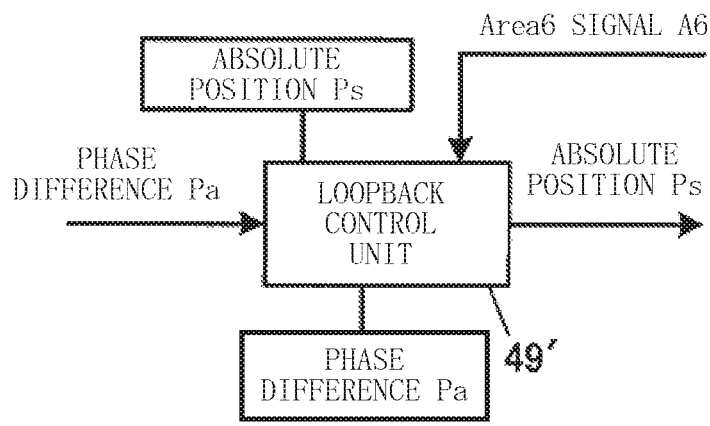
FIG. 8 is a block diagram showing the configuration of a modified loopback control unit of the position detection device.
Figure 9:
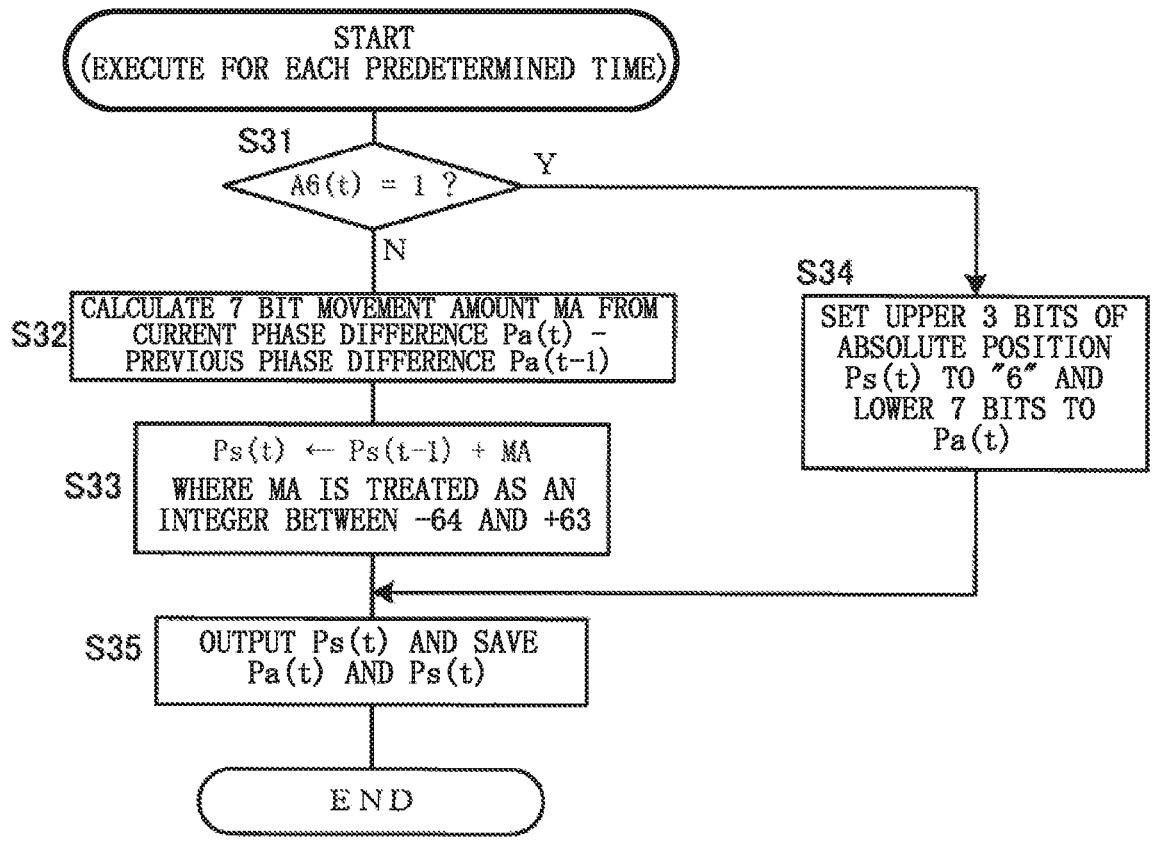
FIG. 9 is a flowchart of a process that is executed by the loopback control unit shown in FIG. 8.

Modification of the Loopback Control Unit: FIGS. 8 and 9

Next, various modifications of the above-described embodiment will be described.

First, a modification of the loopback control unit will be described. FIG. 8 shows a loopback control unit 49' according to this modification. The loopback control unit 49' shown in FIG. 8 is different from the loopback control unit 49 of FIG. 5 in that it calculates the absolute position Ps on the basis of only the movement amount MA calculated from the phase difference Pa, without directly using the phase difference Pa outside of area 6. More specifically, the loopback control unit 49' executes the position detection process of FIG. 9 instead of the position detection process of FIG. 7.

When a phase difference Pa is input from the phase difference detector 47, the loopback control unit 49' acquires the signal A6 at that point in time and starts the process shown in the flowchart of FIG. 9. In the process of FIG. 9, the loopback control unit 49' first determines whether or not the value of the current signal A6(t) is "1" (S31). If the determination is No, the loopback control unit 49' first calculates the difference between the current phase difference Pa(t) and the previous phase difference Pa(t−1) in 7 bits, and sets that value as the movement amount MA (S32). This calculation is the same as Step S12 in FIG. 7. Next, the loopback control unit 49' adds the movement amount MA calculated in Step S32 to the previous absolute position Ps(t−1) to calculate the current absolute position Ps(t) (S33).

Additionally, in the case of Yes in Step S31, because it can be understood that the movable element 30 is in "Area6" in the same manner as in the case of Yes in Step S11 in FIG. 7, it is possible to generate the current absolute position by setting the value of the upper 3 bits of the absolute position Ps(t) to "6," which indicates "Area6" and setting the value of the lower 7 bits to Pa(t) (S34). In any case, the generated absolute position Ps(t) is output, Pa(t) and Ps(t) are stored for reference during the subsequent process (S35), and the process is ended. It is possible to calculate the absolute position Ps(t) in the same manner as in the process of FIG. 7 with the process described above.

Figure 10:
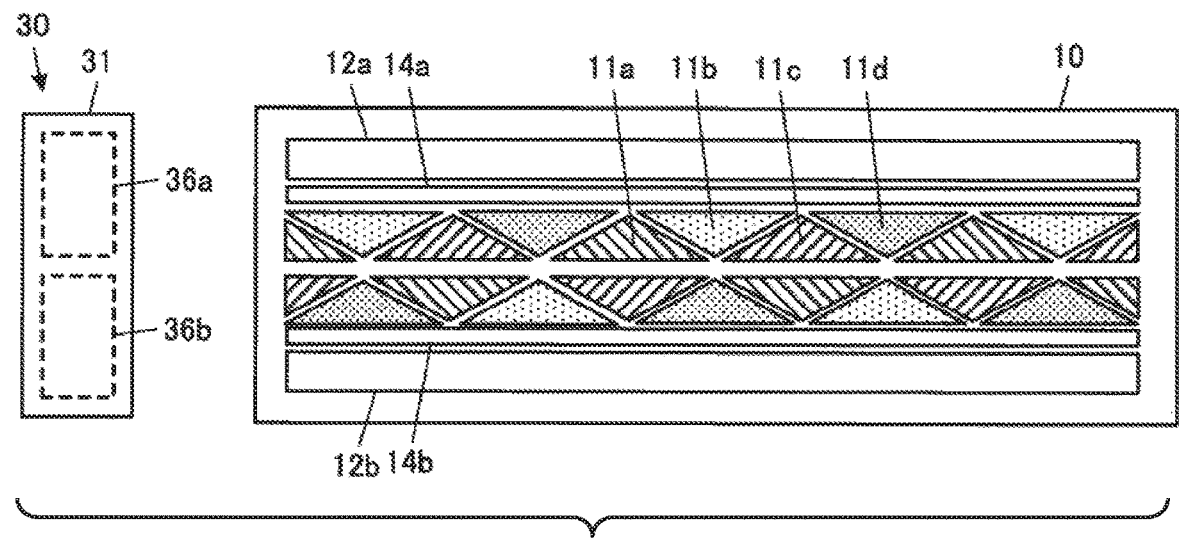
FIG. 10 is a top plan view of a position detection device showing a first modification of a signal electrode and a movable element electrode.
Figure 11:
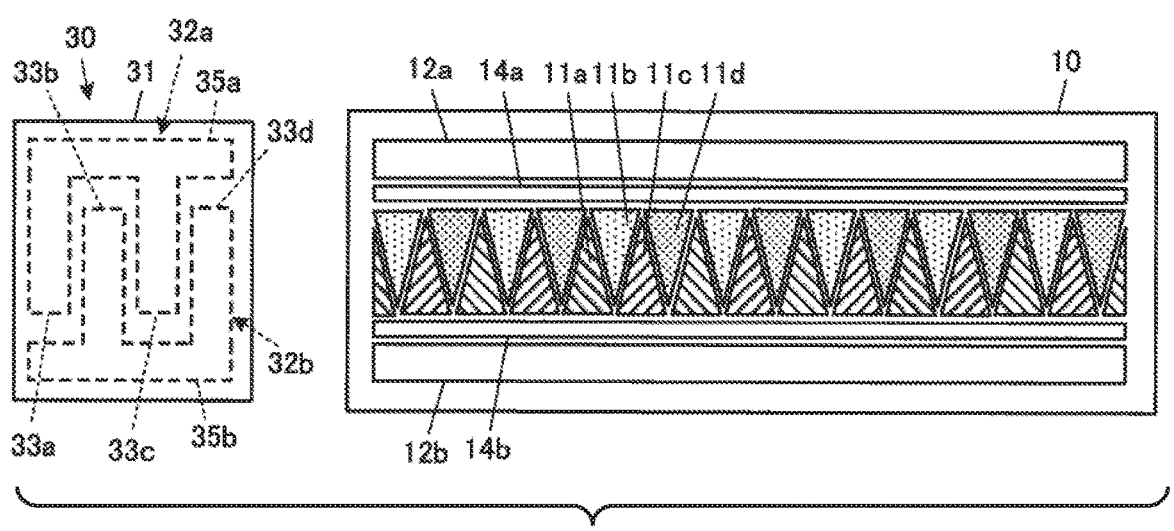
FIG. 11 is a top plan view of a position detection device showing a second modification of a signal electrode and a movable element electrode.

Modification of the Signal Electrode: FIGS. 10 and 11

Next, a modification of the shape and arrangement of the signal electrode 11 will be described. The shape and arrangement of the electrodes provided on the movable element 30 side also change in accordance with a change in the shape of the signal electrode 11.

FIGS. 10 and 11 respectively show the electrodes on the movable element 30 side and the signal electrode 11 according to different modifications. In these drawings, the same reference symbols are used for locations that correspond to the above-described embodiment. In addition, the hatching applied to the electrodes indicate the phase of the electrode, in the same manner as the above-described embodiment. The same shall apply to each of the modifications described below.

In the first modification shown in FIG. 10, the signal electrode 11 of each phase is formed in a triangular shape, and signal electrodes 11 of opposite phase are arranged in mutually line-symmetric positions, and the lateral center line in the drawing in the area where the signal electrodes 11 are arranged is the axis of symmetry. For example, a third phase electrode 11c disposed in a position that is symmetrical to the first phase electrode 11a, and a fourth phase electrode 11d is disposed in a position that is symmetrical to the second phase electrode 11b. On both the upper side and the lower side of the axis of symmetry, four-phase signal electrodes 11 are arranged one-dimensionally in repeating fashion in the movement direction of the movable element 30. As long as the signal electrodes 11 are arranged along some type of line, it is considered to be "one-dimensional", regardless of whether the line is straight or curved. A plurality of rows may be used, as in this example.

Corresponding to the electrodes 11, 12 on the substrate 10 side, movable element electrodes 36a, 36b of corresponding sizes are disposed on the movable element 30 side. The movable element electrode 36a is capacitively coupled to the extraction electrode 12a and the signal electrode 11 arranged on the upper row in the drawing. The movable element electrode 36b is capacitively coupled to the extraction electrode 12b and the signal electrode 11 arranged on the lower row in the drawing.

As described above, because signal electrodes 11 of opposite phases are arranged in mutually line-symmetric positions, signals of opposite phase are induced in the movable element electrodes 36a, 36b in accordance with the supply of electrical signals of each phase to the signal electrodes 11, and it is possible to amplify the signals by taking the difference between the two signals, in the same manner as in the case of the above-described embodiment.

In FIG. 10, the movable element electrode 36a is always opposite to two or three signal electrodes 11. However, the phase of the sum total of the electrical signals that are induced in the movable element electrode 36a substantially matches the phase of the signal obtained by adding the electrical signals of opposing signal electrodes 11 by weighting according to the opposing area. Because the signal electrodes 11 are triangular, the phase of the electrical signal changes more linearly with respect to the position of the movable element. That the phase of the electrical signal induced in the movable element electrode 36a gradually changes in conjunction with the movement of the movable element 30 is the same as in the above-described embodiment.

In the same manner as the case of the above-described embodiment, due to capacitive coupling of the movable element electrode 36a, it is possible to extract the electrical signal induced in the extraction electrode 12a due to capacitive coupling of the movable element electrode 36a and to detect the position of the movable element 30 from the phase thereof.

Next, in the second modification shown in FIG. 11, the signal electrode 11 of each phase has the form of an isosceles triangle, where the triangles are arranged in one-dimensional, alternating fashion. The movable element electrodes 32a, 32b on the movable element 30 side are the same as those shown in FIG. 4, and the thickness of each opposing portion 33a-33d is substantially the same as the length of the base of the signal electrode 11. For example, when the first opposing portion 33a substantially overlaps the base of a certain second phase electrode 11b, the third opposing portion 33c overlaps the base of the next second phase electrode 11b.

With the configuration described above as well, the movable element electrode 32a and the movable element electrode 32b oppose signal electrodes 11 of opposite phase, and an electrical signal with a phase in accordance with the position of the movable element 30 is induced. Therefore, in the same manner as the case of the above-described embodiment and first modification, it is possible to extract the electrical signals induced in the extraction electrodes 12a, 12b in accordance with the electrical signals induced in the movable element electrodes 32a, 32b, and to detect the position of the movable element 30 by detecting the phase thereof.

Figure 12:
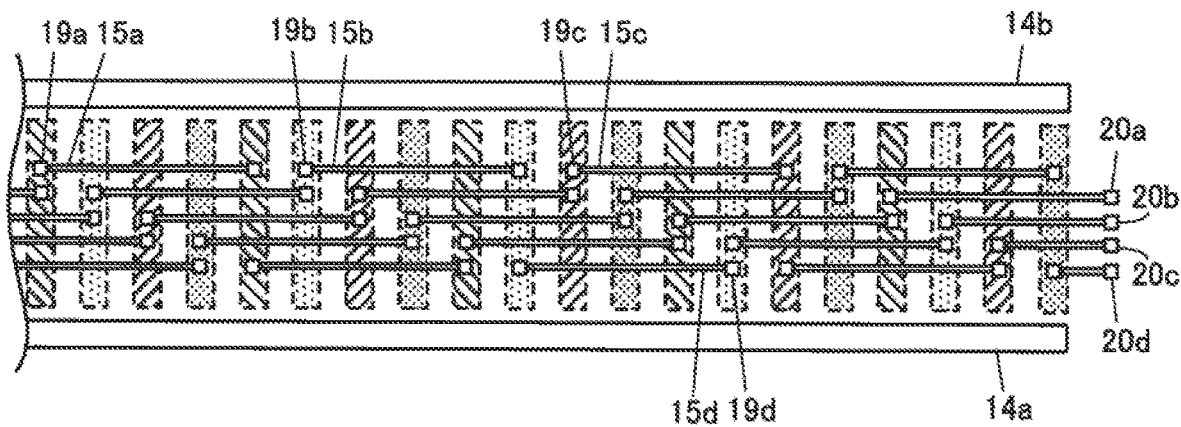
FIG. 12 is a top plan view of a position detection device showing a First modification of a wiring electrode.
Figure 13:
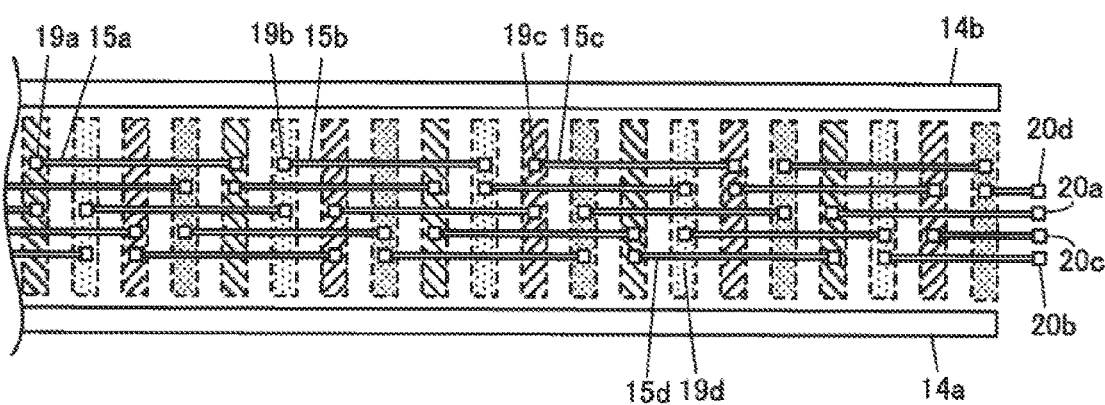
FIG. 13 is a top plan view of a position detection device showing t a second modification of a wiring electrode.

Modification of the Wiring Electrode: FIGS. 12 and 13

Next, a modification of the shape and arrangement of the wiring 15 will be described. FIGS. 12 and 13 respectively show the electrodes on the movable element 30 side and the signal electrode 11 according to different modifications. Although the figures show the arrangement of the wiring 15 and the via 19, in the same manner as FIG. 3, only the inner side portions of the air gaps 14a, 14b are shown.

In FIG. 3, the wiring 15 is partially oblique with respect to the arrangement direction of the signal electrodes 11 (movement direction of the movable element 30), and the wiring 15 of each phase has been moved close to or away from the extraction electrode 12, in accordance with the position in the arrangement direction of the signal electrode 11.

However, even if the wiring 15 is arranged so as to be always parallel to the arrangement direction of the signal electrodes 11, it is possible to electrically connect the two wirings 15 on the left and right using two of the vias 19 at the signal electrode (refer to FIGS. 2 and 3). That is, a each signal electrode, it is possible to change the distance of the wiring 15 of each phase from the extraction electrode 12. For example, the wiring 15 and the via 19 of each phase may be arranged in the order shown in FIG. 12, or as shown in FIG. 13.

Regardless of the arrangement, the effect described in the embodiment above can be achieved with a configuration such that wires 15 of different phase arrive at positions closest to the extraction electrode 12, among the four-phase wirings 15, in accordance with the position in the arrangement direction of the signal electrode 11, and such that the wiring 15 of each phase is in a position closest to the extraction electrode 12, among the four-phase wirings 15, at intervals that are substantially equal in length when viewed in the arrangement direction of the signal electrodes 11.

Other Modifications

The foregoing concludes the description of the embodiments; however, it goes without saying that the specific configuration of the device, shape of each part, configuration of the circuit, etc., are not limited to those described in the foregoing embodiments.

For example, in the above-described embodiment, the air gaps 14a, 14b are provided in one substrate 10; however, the substrate may be divided into a plurality of substrates, and air gaps may be formed therebetween at set intervals.

Figure 14:
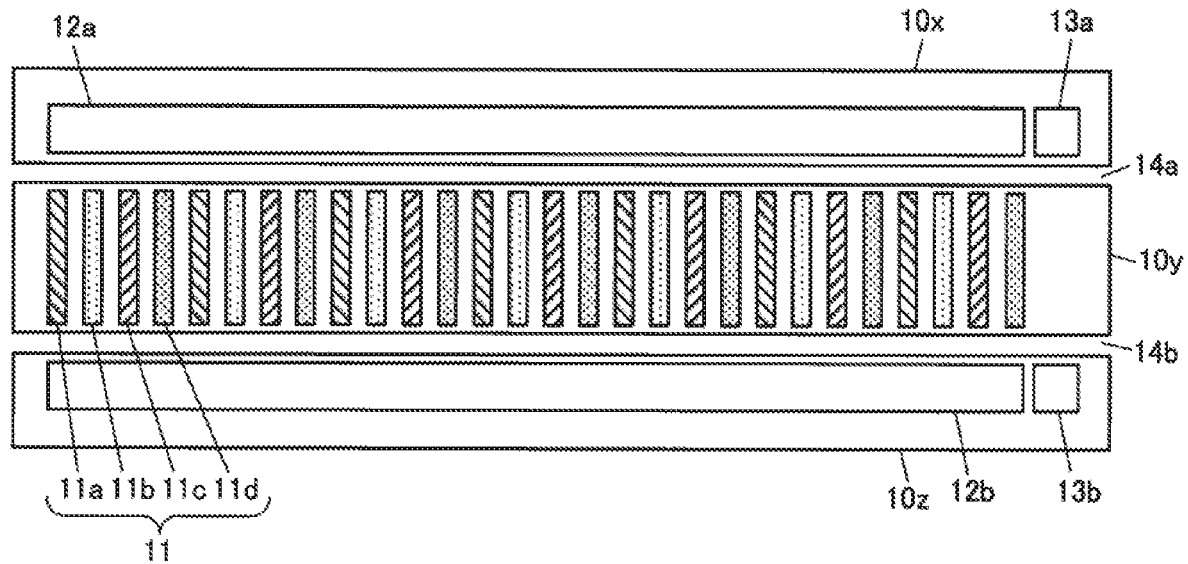
FIG. 14 is a top plan view of a modified substrate for use in the position detection device.

FIG. 14 shows an example thereof. In the example of FIG. 14, the substrate, which is the fixed element, is configured by being divided into three parts, a first substrate 10x to a third substrate 10z. Then, by assembling these substrates on a support member at a set interval therebetween, the air gap 14a is thrilled between the first substrate 10x and the second substrate 10y, and the air gap 14b is formed between the second substrate 10y and the third substrate 10z. The same effect as the above-described embodiment can also be achieved by such a configuration.

In addition, in the embodiment described above, an example was described in which the wiring 15 and the via 19 are provided on a second surface of the substrate 10. However, the wiring 15 and the via 19 can be provided within the substrate 10.

Figure 15:
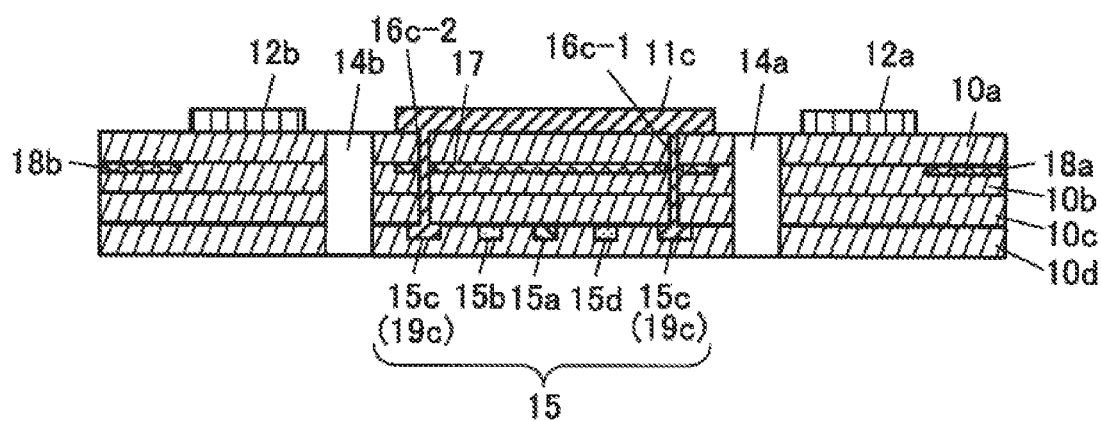
FIG. 15 is a cross-sectional view of a modified substrate corresponding to FIG. 2, a modification, in which a wiring electrode is disposed within the substrate.

FIG. 15 shows an example thereof. In the example of FIG. 15, the substrate 10 has a four-layer structure with a first layer 10a to a fourth layer 10d, and the wiring 15 and the via 19 are provided below the third layer 10c. That is, they are provided within the substrate 10 and are covered by the fourth layer 10d. The same effect as the above-described embodiment can also be achieved by such a configuration. There is also the effect that it is possible to prevent damage to the wiring 15 and the via 19.

In addition, a four-phase signal electrode 11 was used in the embodiment described above; however, the same position detection of at movable element 30 is possible using any n-phase (where n is an integer of 2 or more) signal electrode 11, such as two-phase, three-phase, five-phase, or more.

The position detection device 1 can be applied to any device that receives operations from a user. The device may be one that controls the parameter values of another device according to the detection result of an operation. It is also not necessary to use the detection result of an operation for controlling a parameter value.

In addition, the configurations and modifications described above may be appropriately combined and applied as long as they are compatible.

As is obvious from the foregoing description, it is possible to provide a position detection device that can precisely detect the relative positions of a fixed element and a movable element that moves on the fixed element, even if the range of possible movement of the movable element is increased.

What is claimed is:

1. A fixed element to be used in a position detection device for detecting a position of a movable element that moves on the fixed element, the fixed element comprising:
   a substrate having a first surface, a second surface that faces in an opposite direction to the first surface, and a low-dielectric constant area having a lower dielectric constant than other portions of the substrate;
   a plurality of first electrodes disposed on the first surface of the substrate, the first electrodes including three or more phases arranged one-dimensionally in a repeating pattern in a movement direction of the movable element;
   a second electrode disposed on the first surface of the substrate and arranged in the movement direction of the movable element adjacent the first electrodes;
   a first electrical signal propagation shield provided in a position that overlaps with the first electrodes as viewed in a perpendicular direction perpendicular to the first surface of the substrate, the first electrical signal propagation shield being arranged within the substrate; and
   a second electrical signal propagation shield that is arranged within the substrate such that the second electrical signal propagation shield is disposed between the first and second surfaces in the perpendicular direction, the second electrical signal propagation shield being provided in a position that does not overlap with the first electrodes as viewed in the perpendicular direction, avoiding a position that overlaps an area where the second electrode is arranged as viewed in the perpendicular direction,
   the low-dielectric constant area of the substrate being provided in a position between the first electrodes and the second electrode.

2. The fixed element according to claim 1, wherein the low-dielectric constant area is formed by a slit.

3. The fixed element according to claim 1, wherein the second electrode includes two second electrodes that extend in the movement direction of the movable element on the first surface of the substrate with the first electrodes disposed between the second electrodes, and the low-dielectric constant area includes a first low-dielectric constant area and a second low-dielectric constant area, the first low-dielectric constant area is provided between one of the second electrodes and the first electrodes, and the second low-dielectric constant area is provided between the other of the second electrodes and the first electrodes.

4. A position detection device comprising the fixed element recited in claim 3, and the position detection device further comprising:
   a supply circuit that supplies at least three phase signals corresponding in number to the phases of the first electrodes;
   a movable element having a pair of third electrodes, one of the third electrodes being capacitively coupled to at least a portion of one of the two second electrodes and at least one of the first electrodes while the movable element moves relative to the fixed element, and the other of the third electrodes being capacitively coupled to at least a portion of the other of the second electrode and at least one of the first electrodes having an opposite phase of the at least one of the first electrodes while the movable element moves relative to the fixed element; and
   a detection circuit that detects a difference between two signals that are generated in the two second electrodes in accordance with the supply of signals by the supply circuit due to the third electrodes being capacitively coupled.

5. A position detection device comprising the fixed element recited in claim 1, and the position detection device further comprising:
- a supply circuit that supplies at least three phase signals corresponding in number to the phases of the first electrodes;
- a movable element having a third electrode that is capacitively coupled to at least a portion of the second electrode and at least one of the first electrodes while the movable element moves relative to the fixed element; and
- a detection circuit that detects a signal that is generated in the second electrode in accordance with the supply of signals from the supply circuit due to the third electrode being capacitively coupled.

6. The fixed element according to claim 1, further comprising
- a wiring disposed on the second surface, the wiring electrically connecting the plurality of first electrodes to supply electrical signals to the plurality of first electrodes.

* * * * *